United States Patent
Zhang et al.

(10) Patent No.: US 10,366,270 B2
(45) Date of Patent: Jul. 30, 2019

(54) CAPACITIVE FINGERPRINT SENSOR

(71) Applicant: SHENZHEN GOODIX TECHNOLOGY CO., LTD., Shenzhen (CN)

(72) Inventors: Mengwen Zhang, Shenzhen (CN); Chang Zhan, Shenzhen (CN); Tao Pi, Shenzhen (CN); Birong Lin, Shenzhen (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 53 days.

(21) Appl. No.: 15/694,937

(22) Filed: Sep. 4, 2017

(65) Prior Publication Data

US 2018/0121700 A1 May 3, 2018

Related U.S. Application Data

(63) Continuation of application No. PCT/CN2016/103496, filed on Oct. 27, 2016.

(51) Int. Cl.
*G06K 9/28* (2006.01)
*G06K 9/00* (2006.01)
*G06F 21/32* (2013.01)

(52) U.S. Cl.
CPC ........... *G06K 9/0002* (2013.01); *G06F 21/32* (2013.01)

(58) Field of Classification Search
CPC .................................................. G06K 9/0002
See application file for complete search history.

(56) References Cited

U.S. PATENT DOCUMENTS

| | | | |
|---|---|---|---|
| 2008/0069413 A1 | 3/2008 | Riedijk et al. | |
| 2016/0188949 A1* | 6/2016 | Yang | G06K 9/0002 |
| | | | 382/124 |
| 2016/0307019 A1 | 10/2016 | Zhang et al. | |

(Continued)

FOREIGN PATENT DOCUMENTS

| | | |
|---|---|---|
| CN | 1450489 A | 10/2003 |
| CN | 105046194 A | 11/2015 |
| CN | 105426865 A | 3/2016 |

(Continued)

OTHER PUBLICATIONS

English machine translation of CN105512650A, to Yang Guoqing et al., published on Apr. 20, 2016, pp. 1-8 (Year: 2016).*

*Primary Examiner* — Brian Werner (57) ABSTRACT

Embodiments of the present disclosure provide a capacitive fingerprint sensor. The capacitive fingerprint sensor includes: a first electrode plate layer, a second electrode plate layer and a third electrode plate layer that are sequentially arranged. The first electrode plate layer forms a fingerprint capacitor with a finger, at least one fourth electrode plate layer is arranged between the first electrode plate layer and the second electrode plate layer, a first parasitic capacitor is formed between the first electrode plate layer and the fourth electrode plate layer, and a second parasitic capacitor is formed between the second electrode plate layer and the fourth electrode plate layer; and the capacitive fingerprint sensor further comprises an integrator having an integrating capacitor, and the integrating capacitor is formed between the second electrode plate layer and the third electrode plate layer.

14 Claims, 8 Drawing Sheets

(56) References Cited

U.S. PATENT DOCUMENTS

2018/0300521 A1* 10/2018 Kim .................... G06K 9/0002

FOREIGN PATENT DOCUMENTS

| CN | 205121586 U | 3/2016 |
| CN | 105512650 A | 4/2016 |
| CN | 105740756 A | 7/2016 |
| CN | 205486168 U | 8/2016 |
| KR | 101502911 B1 | 3/2015 |
| KR | 20160109258 A | 9/2016 |
| WO | 2015/135578 A1 | 9/2015 |

* cited by examiner

CAPACITIVE FINGERPRINT SENSOR

CROSS-REFERENCE TO RELATED APPLICATIONS

The present application is a continuation of international application No. PCT/CN2016/103496, filed on Oct. 27, 2016, which is hereby incorporated by reference in its entirety.

TECHNICAL FIELD

Embodiments of the present disclosure relate to the technical field of biometric identification, and in particular, relate to a capacitive fingerprint sensor.

BACKGROUND

Fingerprints are invariable, unique and convenient, which thus provide a high-level identity security authentication. During the identity security authentication, fingerprint sensors are generally used as devices for automatically acquiring the fingerprints.

Based on the sensing mechanism, fingerprint sensors are mainly categorized into optical fingerprint sensors, semiconductor capacitive sensors, semiconductor thermistor sensors, semiconductor pressure sensitive sensors, ultrasound sensors, radio frequency (RF) sensors and the like.

Using a semiconductor capacitive sensor as an example, a finger touching on a "flat plate" in which thousands of semiconductor devices are integrated, forms a side of a capacitor. Since the fingerprints have projections and depressions on the surface thereof, the projections are ridges and the depressions are valleys, an actual distance from a projection to the flat plate is different from an actual distance from a depression to the flat plate, a capacitance formed by the projection and flat plate is also different from that formed by the depression and the flat plate. The acquired different capacitance values are collected, such that fingerprint acquisition is completion.

However, during fingerprint acquisition, due to a parasitic capacitor in the fingerprint sensor or a base capacitor in the fingerprint sensor, a great base signal may be produced at an integrator. The base signal is at least 100 times of a valid signal, and upon amplification, the base signal is much greater than the valid signal; thus, the valid signal is relatively smaller. In addition, the amplified base signal may cause the integrator to reach a saturated state, and thus an output dynamic range of the integrator is small.

SUMMARY

In view of the above, one technical problem to be solved by embodiments of the present disclosure is to provide a capacitive fingerprint sensor, to address the above technical defects in the related art.

Embodiments of the present disclosure provide a capacitive fingerprint sensor. The capacitive fingerprint sensor includes: a first electrode plate layer, a second electrode plate layer and a third electrode plate layer that are sequentially arranged. The first electrode plate layer forms a fingerprint capacitor with a finger, at least one fourth electrode plate layer is arranged between the first electrode plate layer and the second electrode plate layer, a first parasitic capacitor is formed between the first electrode plate layer and the fourth electrode plate layer, and a second parasitic capacitor is formed between the second electrode plate layer and the fourth electrode plate layer; and the capacitive fingerprint sensor further comprises an integrator having an integrating capacitor, and the integrating capacitor is formed between the second electrode plate layer and the third electrode plate layer, wherein the first parasitic capacitor and the second parasitic capacitor have no impact on the integrating capacitor, and the integrating capacitor is configured to store charges from a fingerprint capacitor.

In the capacitive fingerprint sensor, according to embodiments of the present disclosure, the fourth electrode plate layer is arranged between the first electrode plate layer and the second electrode plate layer, and the fourth electrode plate layer makes the first parasitic capacitor and the second parasitic capacitor have no impact on the integrating capacitor, and enables the integrating capacitor to store only the charges from the fingerprint capacitor. Therefore, the dynamic range of the integrator is increased.

BRIEF DESCRIPTION OF THE DRAWINGS

To describe technical solutions according to the embodiments of the present application or in the related art, drawings that are to be referred for description of the embodiments or the related art are briefly described hereinafter. Apparently, the drawings described hereinafter merely illustrate some embodiments of the present disclosure. Persons of ordinary skill in the art may also derive other drawings based on the drawings described herein.

DETAILED DESCRIPTION

Practice of the present application is described in detail with reference to drawings and specific embodiments, such that the practice of addressing the technical problem using the technical means according to the present application and achieving the technical effects may be better understood and conducted.

Figure 1:
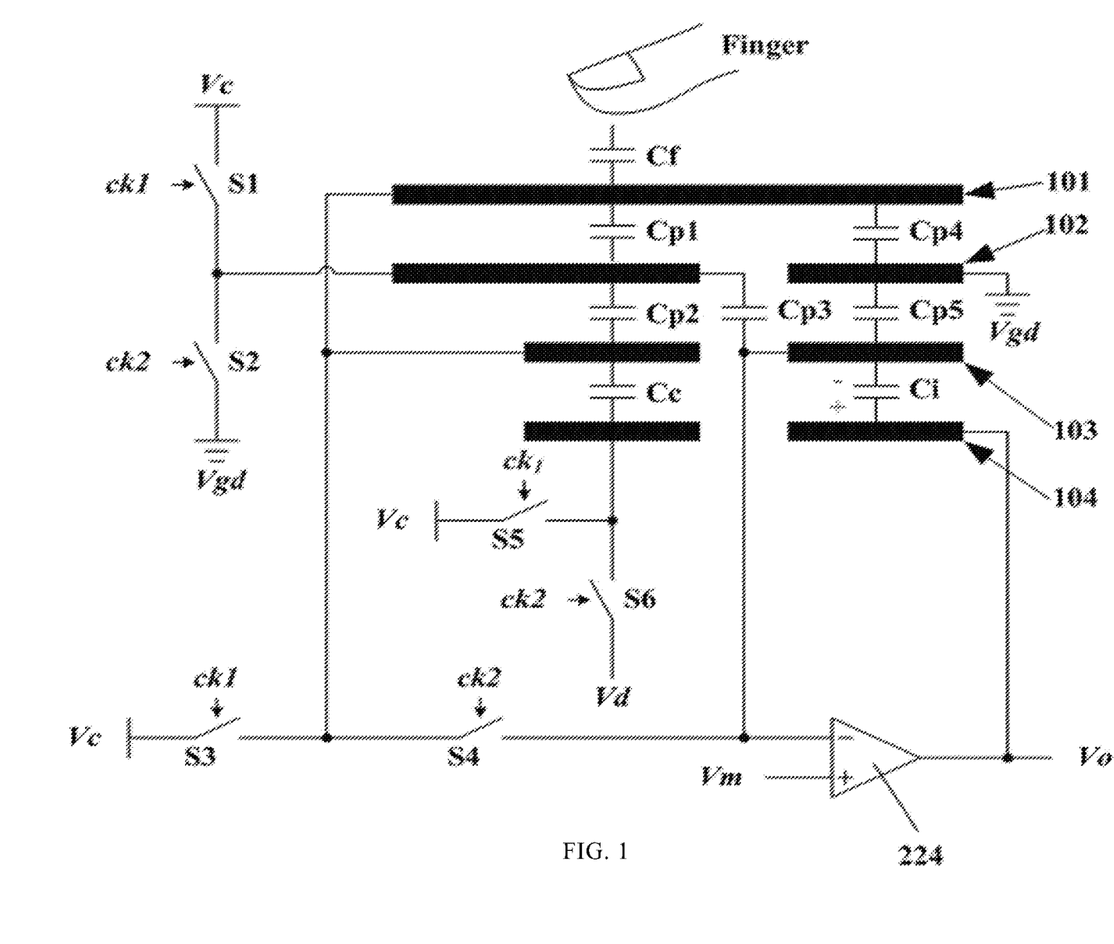
FIG. 1 is a schematic structural diagram of a typical fingerprint sensor.

FIG. 1 is a schematic structural diagram of a typical fingerprint sensor. As illustrated in FIG. 1, a fingerprint sensor, which is manufactured using one polysilicon layer and six metal layers (which is abbreviated as 1P6M) configuration, may include an $N^{th}$ metal layer 101, an $N-1^{th}$ metal layer 102, an $N-2^{th}$ metal layer 103 and an $N-3^{th}$ metal layer 104, wherein N indicates a top metal layer in the manufacture process of the fingerprint sensor. In this embodiment, N is equal to 6, the $N^{th}$ metal layer 101 is a sixth metal layer, the $N-1^{th}$ metal layer 102 is a fifth metal layer, the $N-2^{th}$ metal layer 103 is a fourth metal layer, the $N-3^{th}$ metal layer 104 is a third metal layer, and two remaining metal layers may be used as wiring layers, or electrode layers of another circuit. In FIG. 1, the fingerprint sensor further includes an integrator. The integrator includes an amplifier 224 and an integrating capacitor $C_i$, and is configured to perform integration for charges from a fingerprint capacitor.

The $N^{th}$ metal layer 101 is a single-sheet metal layer; each of the $N-1^{th}$ metal layer 102, the $N-2^{th}$ metal layer 103 and the $N-3^{th}$ metal layer 104 includes two metal electrodes. A finger forms a fingerprint capacitor $C_f$ with the $N^{th}$ metal layer 101, and parasitic capacitors $C_{p1}$ and $C_{p4}$ are formed between $N^{th}$ metal layer 101 and the $N-1^{th}$ metal layer 102. Since a metal electrode forming a parasitic capacitor $C_{p4}$ in the $N-1^{th}$ metal layer 102 may be connected to a system ground $V_{gd}$, the parasitic capacitor $C_{p4}$ may also be referred to as a ground capacitor. Parasitic capacitors $C_{p2}$, $C_{p3}$ and $C_{p5}$ are formed between the $N-1^{th}$ metal layer 102 and the $N-2^{th}$ metal layer 103; a base cancelling capacitor $C_c$ and an integrating capacitor $C_i$ are formed between the $N-2^{th}$ metal layer 103 and the $N-3^{th}$ metal layer 104.

The fingerprint sensor as illustrated in FIG. 1 further includes a plurality of switches $S_1$ to $S_6$. The switches S1, S3, S5 are controllable by a first clock signal $ck_1$ to make a switch-on or switch-off action, and the switches S2, S4, S6 are controllable by a second clock signal $ck_2$ to make a switch-on or switch-off action. The first clock signal $ck_1$ and the second clock signal $ck_2$ are respectively two phase non-overlapping clock signals. Within an integration processing cycle of the fingerprint sensor, the first clock signal $ck_1$ is high while the second clock signal $ck_2$ is low, and the first clock signal $ck_1$ is low while the second clock signal $ck_2$ is high.

When the first clock signal $ck_1$ is high, the switches $S_1$, $S_3$ and $S_5$ are switched on; meanwhile the second clock signal $ck_2$ is low, and the switches $S_2$, $S_4$ and $S_6$ are switched off. In this case, the $N^{th}$ metal layer 101, the $N-1^{th}$ metal layer 102, the $N-2^{th}$ metal layer 103 and the $N-3^{th}$ metal layer 104 are all connected to a power-supply voltage $V_c$, all the charges in the parasitic capacitors $C_{p1}$, $C_{p2}$ and the base cancelling capacitor $C_c$ are discharged, that is, no charge exists in the parasitic capacitors $C_{p1}$, $C_{p2}$ and the base cancelling capacitor $C_c$; and the fingerprint capacitor $C_f$ and the parasitic capacitor $C_{p4}$ are fully charged with charges. A metal electrode forming the parasitic capacitor $C_{p3}$ in the $N-1^{th}$ metal layer 102 is connected to the power-supply voltage $V_c$. Since an amplifier 224 is subjected to a virtual short, a metal electrode forming the parasitic capacitor $C_{p3}$ in the $N-2^{th}$ metal layer 103 is connected to a common-mode voltage $V_m$. In this case, the voltages at two terminals of the parasitic capacitor $C_{p3}$ are equal, and therefore, the charges in the parasitic capacitor $C_{p3}$ are partially discharged. A metal electrode forming a parasitic capacitor $C_{p5}$ in the $N-1^{th}$ metal layer 102 is connected to a system ground $V_{gd}$ having a fixed level. Since the amplifier is virtual short, a metal electrode forming the parasitic capacitor $C_{p5}$ in the $N-2^{th}$ metal layer 103 is connected to the common-mode voltage $V_m$. In this case, two electrode plates of the parasitic capacitor $C_{p5}$ are both fixed level, and the charges in the parasitic capacitor $C_{p5}$ do not change.

When the second clock signal $ck_2$ is high, the switches $S_2$, $S_4$ and $S_6$ are switched on; meanwhile the first clock signal $ck_1$ is low, and the switches $S_1$, $S_3$ and $S_5$ are switched off. In this case, the charges in the parasitic capacitors $C_{p1}$, $C_{p2}$ and $C_{p4}$, the base cancelling capacitor $C_c$ and the fingerprint capacitor $C_f$ are transferred to the integrating capacitor $C_i$, and no charge in the parasitic capacitors $C_{p3}$ and $C_{p5}$ is transferred to the integrating capacitor $C_i$. Accordingly, one integration process is implemented.

No charge in the parasitic capacitors $C_{p3}$ and $C_{p5}$ is transferred to the integrating capacitor $C_i$ for the following reasons.

When the first clock signal $ck_1$ is high while the second clock signal $ck_2$ is low, the metal electrode forming the parasitic capacitor $C_{p3}$ in the $N-1^{th}$ metal layer 102 is connected to the power-supply voltage $V_c$. Since the amplifier 224 is subjected to a virtual short, the metal electrode forming the parasitic capacitor $C_{p3}$ in the $N-2^{th}$ metal layer 103 is connected to the common-mode voltage $V_m$. Therefore, the charges in the parasitic capacitor $C_{p3}$ are partially discharged, causing an increase of an output voltage $V_o$ of the integrator. When the first clock signal $ck_1$ is low while the second clock signal $ck_2$ is high, the metal electrode forming the parasitic capacitor $C_{p3}$ in the $N-1^{th}$ metal layer 102 is connected to the system ground $V_{gd}$ having a fixed level, and the metal electrode forming the parasitic capacitor $C_{p3}$ in the $N-2^{th}$ metal layer 103 is connected to the common-mode voltage $V_m$. In this case, the parasitic capacitor $C_{p3}$ causes a decrease of the output voltage $V_o$ of the integrator. Within an integration process cycle, the variation quantities of the output voltage $V_o$ of the integrator caused by the parasitic capacitor $C_{p3}$ are offset by each other. Therefore, the parasitic capacitor $C_{p3}$ causes no impact on the output voltage $V_o$ of the integrator.

The metal electrode forming the parasitic capacitor $C_{p5}$ in the $N-1^{th}$ metal layer 102 is connected to the system ground $V_{gd}$ having a fixed level. Since the amplifier is subjected to a virtual short, the metal electrode forming the parasitic capacitor $C_{p5}$ in the $N-2^{th}$ metal layer 103 is connected to the common-mode voltage $V_m$. The common-mode voltage $V_m$ is a fixed level, that is, the parasitic capacitor $C_{p5}$ is shielded relative to the integrating capacitor $C_i$, such that no charge is transferred to the integrating capacitor $C_i$.

Upon the above integration process, an increment $\Delta V_o$ of the output voltage of the integrator may be calculated using a formula (1). For brevity of description, it is assumed that the power-supply voltage is $V_c$, an output voltage of an external digital-to-analog converter (DAC) is $V_d$, the common-mode voltage is $V_m$, and the output voltage of the integrator is $V_o$.

$$\Delta V_o = \frac{C_f + C_c + C_{p1} + C_{p2} + C_{p4}}{C_i} V_m - \frac{C_c}{C_i} V_d - \frac{C_f + C_{p4}}{C_i} V_c \quad (1)$$

As seen from the above formula (1), the increment $\Delta V_o$ of the output voltage of the integrator is related to the parasitic capacitors $C_{p1}$, $C_{p2}$ and $C_{p4}$. Since a great base signal may be produced in the presence of $C_{p1}$, $C_{p2}$ and $C_{p4}$, and a valid signal produced by the fingerprint capacitor $C_f$ each time is only 1/1000 to 1/100 of the base signal, the integrator is saturated before obtaining a desired signal amount. Consequently, the integrator has a small dynamic range.

Therefore, in FIG. 1, it is intended to offset the base signal by adjusting the output voltage $V_d$ of the external digital-to-analog converter DAC. However, as seen from the formula (1), whether the base signals are cancelled thoroughly or not is related to the parasitic capacitors $C_{p1}$, $C_{p2}$ and $C_{p4}$, the base cancelling capacitor $C_c$, the common-mode voltage $V_m$, and the output voltage $V_d$ of the external digital-toanalog converter DAC. However, in practice product design, due to different processes and deviations of pattern arrangement, the parasitic capacitors $C_{p1}$, $C_{p2}$ and $C_{p4}$ may be subjected to great change, and impact a practical value of the output voltage $V_d$ of the external digital-to-analog converter DAC. Even it is probable that the output voltage $V_d$ of the external digital-to-analog converter DAC fails to cover the changes of the parasitic capacitors $C_{p1}$, $C_{p2}$ and $C_{p4}$. As a result, the base signal may not be thoroughly cancelled, that is, cancellation of the base signal of the fingerprint sensor is not accurate.

In addition, in FIG. 1, the parasitic capacitor $C_{P3}$ is a parasitic capacitor formed by coupling of metal electrodes of the N-1$^{th}$ metal layer 102 and the N-2$^{th}$ metal layer. Although the output voltage $V_o$ of the integrator may not be changed, the parasitic capacitor $C_{p3}$ may cause a transition to the output voltage $V_o$ of the integrator. Without considering impacts caused by other capacitors, within an integration process of the parasitic capacitor $C_{p3}$, an output voltage transition $\delta V_o$ of the integrator is calculated by formula (2).

$$\delta V_o = \frac{C_{p3}}{C_i} V_c \qquad (2)$$

As seen from the above formula, if the parasitic capacitor $C_{p3}$ is greater, the output voltage transition $\delta V_o$ of the integrator may be greater, and thus the dynamic range of the integrator may be decreased.

Figure 2:
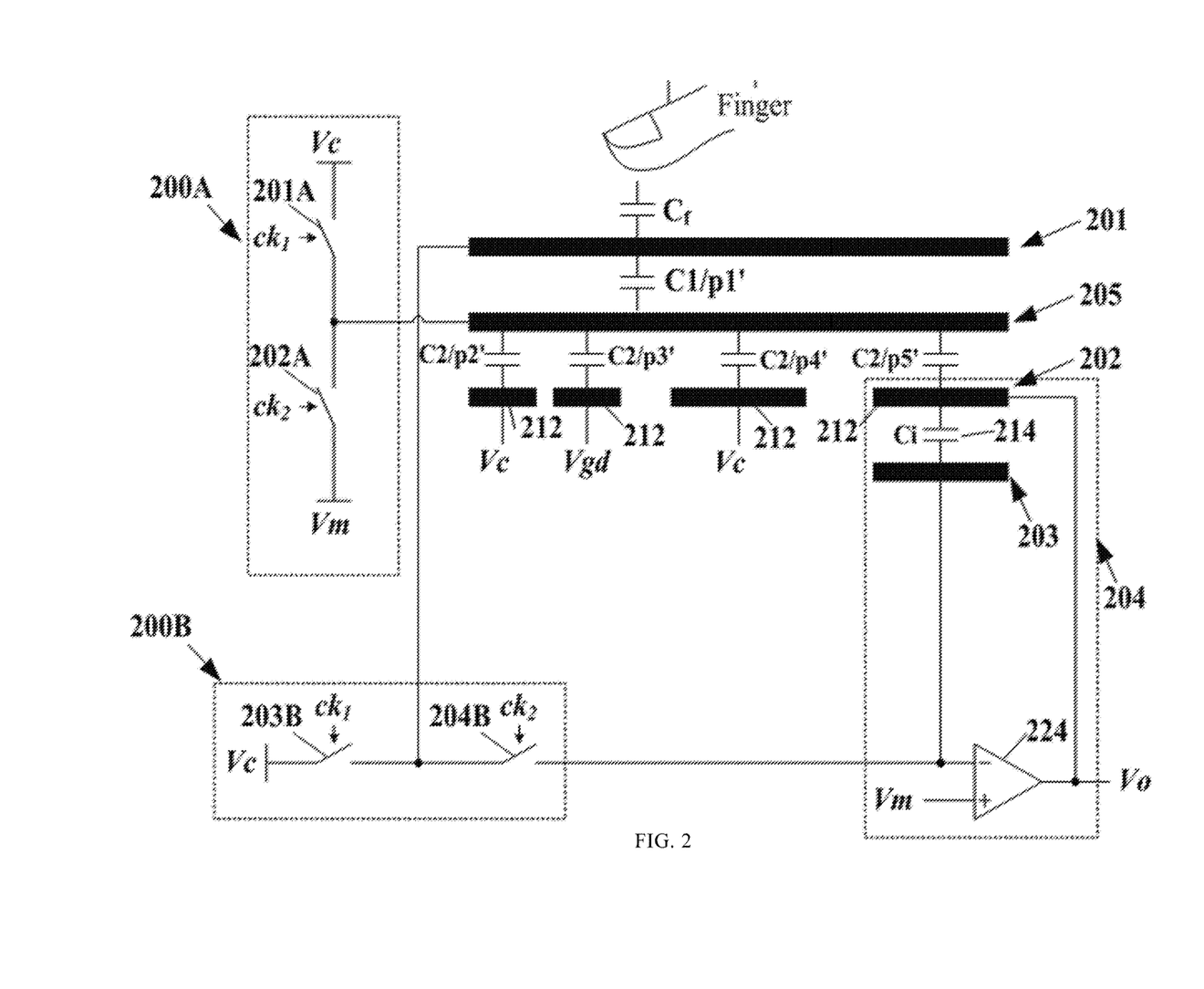
FIG. 2 is a schematic structural diagram of a fingerprint sensor according to Embodiment 1 of the present disclosure.

FIG. 2 is a schematic structural diagram of a fingerprint sensor according to a first embodiment of the present disclosure. In this embodiment, the capacitive fingerprint sensor includes: a first electrode plate layer 201, a second electrode plate layer 202, a third electrode plate layer 203 and an integrator 204 that are arranged from top to bottom. The integrator 204 includes an integrating capacitor 214 and an amplifier 224, and is configured to perform integration for the charges of the capacitors from top to bottom. A fourth electrode plate layer 205 is arranged between the first electrode plate layer 201 and the second electrode plate layer 202. A first parasitic capacitor $C_{1/p1'}$ is formed between the first electrode plate layer 201 and the fourth electrode plate layer 205.

In this embodiment, the fourth electrode plate layer 205 may be specifically a single-sheet metal layer, and correspondingly, the first electrode plate layer 201 may also be a single-sheet metal layer. The first electrode plate layer 201 and the fourth electrode plate layer 205 are arranged in parallel and opposite to each other.

In this embodiment, the first electrode plate layer 201 forms the fingerprint capacitor $C_f$ with a finger, and the second electrode plate layer 202 forms an integrating capacitor 214 (which is also marked as $C_i$) with the third electrode plate layer 203. Specifically, the second electrode plate layer 202 includes at least one second metal electrode 212. In the embodiment as illustrated in FIG. 2, the second electrode plate layer 202 specifically includes four second metal electrodes 212, and the third electrode plate layer includes one third metal electrode 213. One of the second metal electrodes 212 of the second electrode plate layer 202 forms the integrating capacitor 214 with the third metal electrode 213, and the other three second metal electrodes 212 of the second electrode plate layer 202 are used as wiring layers or metal electrodes of another circuit.

A plurality of second parasitic capacitors are formed between the second electrode plate layer 202 and the fourth electrode plate layer 205. For example, in the embodiment as illustrated in FIG. 2, the four second metal electrodes 212 of the second electrode plate layer 202 respectively form four second parasitic capacitors $C_{2/p2'}$, $C_{2/p3'}$, $C_{2/p4'}$ and $C_{2/p5'}$ with the fourth electrode plate layer 205.

In this embodiment, during the integration process of the integrator 204, no charge of the first parasitic capacitor $C_{1/p1'}$ participates in the integration process, the charges of the second parasitic capacitors $C_{2/p2'}$, $C_{2/p3'}$, $C_{2/p4'}$ and $C_{2/p5'}$ is not transferred to the integrating capacitor 214 and thus do not participate in the integration process, and only the charges of the fingerprint capacitor $C_f$ are transferred to the integrating capacitor 214 and participate in the integration process of the integrator 204. Therefore, the first parasitic capacitor $C_{1/p1'}$ and the second parasitic capacitors $C_{2/p2'}$, $C_{2/p3'}$, $C_{2/p4'}$ and $C_{2/p5'}$ are effectively prevented from producing corresponding base signals, that is, the base signals are reduced, such that the integrator 204 is prevented from reaching a saturated state before obtaining a desired signal amount. In this way, the dynamic range of the integrator 204 is increased. The detailed mechanism may be described with reference to the mechanism of the capacitive fingerprint sensor in this embodiment.

To practice the technical solution according to this embodiment, in this embodiment, the capacitive fingerprint sensor may further include:

a first switch circuit 200A; the first switch circuit 200A is controlled to make a switch-on or switch-off action, such that the voltage of the fourth electrode plate layer 205 is the power-supply voltage $V_c$ or the common-mode voltage $V_m$. Correspondingly, the voltage of the first electrode plate layer 201 is the power-supply voltage $V_c$ or the common-mode voltage $V_m$, and therefore, the first parasitic capacitor $C_{1/p1}$ has no impact on the integrating capacitor 214.

Specifically, the first switch circuit 200A may include a first switch 201A and a second switch 202A. The first switch 201A is controllable by a first switch control signal to make a switch-on or switch-off action, and the second switch 202A is controllable by a second switch control signal to make a switch-on or switch-off action, such that the voltage of the fourth electrode plate layer 205 is the power-supply voltage $V_c$ or the common-mode voltage $V_m$. The first switch control signal and the second switch control signal are inverse to each other.

In this embodiment, the first switch control signal may specifically be the first clock signal $ck_1$, and the second switch control signal may specifically be the second clock signal $ck_2$; the first clock signal $ck_1$ and the second clock signal $ck_2$ are two-phase non-overlapping clock signals.

One terminal of the first switch 201A is connected to the power-supply voltage $V_c$, the other terminal of the first switch 201A is connected to one terminal of the second switch 202A and then connected to the fourth electrode plate layer 205, and the other terminal of the second switch 202A is connected to the common-mode voltage $V_m$.

To practice the technical solution according to this embodiment, in this embodiment, the capacitive fingerprint sensor may further include:

a second switch circuit 200B; the second switch circuit 200B is controlled to make a switch-on or switch-off action, such that the voltage of the first electrode plate layer 201 is the power-supply voltage $V_c$ or the common-mode voltage $V_m$; Correspondingly the voltage of the fourth electrode plate layer 205 is the power-supply voltage $V_c$ or the common-mode voltage $V_m$.

Specifically, the second switch circuit 200B may include a third switch 203B and a fourth switch 204B. The third switch 203B is controllable by a third switch control signal to make a switch-on or switch-off action, and the fourth switch 204B is controllable by a fourth switch control signal to make a switch-on or switch-off action, such that the voltage of the first electrode plate layer 201 is the power-supply voltage $V_c$ or the common-mode voltage $V_m$. The third switch control signal and the fourth switch control signal are inverse to each other.

In this embodiment, the first switch control signal may be used as the third switch control signal, and the second switch control signal may be used as the fourth switch control signal. That is, the third switch control signal is the first clock signal $ck_1$, and the fourth switch control signal is the second clock signal $ck_2$. Further, one terminal of the third switch 203B is connected to the power-supply voltage $V_c$, the other terminal of the third switch 203B is connected to one terminal of the fourth switch 204B and then connected to the first electrode plate layer 201, and the other terminal of the fourth switch 204B is connected to an input terminal of the integrator 204. Specifically, in this embodiment, the integrator 204 further includes the amplifier 224 in addition to the integrating capacitor 214. The amplifier 224 has a positive input terminal and a negative input terminal. The positive input terminal is connected to the common-mode voltage $V_m$, and the other terminal of the fourth switch 204B is connected to the negative input terminal of the amplifier 224. Therefore, the second metal electrode 212 forming the integrating capacitor 214 in the second electrode plate layer 202 is connected to the output terminal of the amplifier 224, that is, connected to the output terminal of the integrator 204, such that the output voltage Vo of the integrator 204 is loaded to the second metal electrode 212 forming the integrating capacitor 214 in the second electrode plate layer 202; and the third metal electrode 213 is connected to the negative input terminal of the amplifier 224.

The mechanism of the capacitive sensor in this embodiment is described as follows:

(1) When the first clock signal $ck_1$ is a high level, the first switch 201A and the third switch 203B are switched on; meanwhile the second clock signal $ck_2$ is a low level, the second switch 202A and the fourth switch 204B are switched off, such that the first electrode plate layer 201 and the fourth electrode plate layer 205 are both connected to the power-supply voltage $V_c$. In this case, no charge exists in the first parasitic capacitor $C_{1/p1'}$, and the first parasitic capacitor $C_{1/p1'}$ is shielded relative to the integrator 204. Moreover, the second metal electrodes 212 of the second electrode plate layer 202 are connected to the common-mode voltage $V_m$, the system ground $V_{gd}$ or the output voltage $V_o$ of the integrator 204. These voltages are essentially all fixed levels, and thus the second parasitic capacitors $C_{2/p2'}$, $C_{2/p3'}$, $C_{2/p4'}$ and $C_{2/p5'}$, are shielded relative to the integrator 204. That is, the second parasitic capacitors $C_{2/p2'}$, $C_{2/p3'}$, $C_{2/p4'}$ and $C_{2/p5'}$ have no impact on the integrating capacitor 214.

(2) When the second clock signal $ck_2$ is a high level, the second switch 202A and the fourth switch 204B are switched on; meanwhile the first clock signal $ck_1$ is a low level, the first switch 201A and the third switch 203B are switched off, such that the first electrode plate layer 201 and the fourth electrode plate layer 205 are both connected to the common-mode voltage $V_m$. In this case, no charge exists the first parasitic capacitor $C_{1/p1'}$, and the first parasitic capacitor $C_{1/p1'}$ is shielded relative to the integrator 204. That is, no charge in the first parasitic capacitor $C_{1/p1'}$ participates in the integration process. In addition, since the second metal electrodes 212 of the second electrode plate layer 202 are connected to the common-mode voltage $V_m$, the system ground $V_{gd}$ or the output voltage $V_o$ of the integrator 204. These voltages are essentially all fixed levels, and thus the second parasitic capacitors $C_{2/p2'}$, $C_{2/p3'}$, $C_{2/p4'}$ and $C_{2/p5'}$, are also shielded. That is, the second parasitic capacitors $C_{2/p2'}$, $C_{2/p3'}$, $C_{2/p4'}$ and $C_{2/p5'}$ have no impact on the integrating capacitor 214. Therefore, the charges in the second parasitic capacitors $C_{2/p2'}$, $C_{2/p3'}$, $C_{2/p4'}$ and $C_{2/p5'}$ do not participate in the integration process.

As seen from the above, regardless of in circumstance (1) or circumstance (2), no charge exists in the first parasitic capacitor $C_{1/p1'}$, and thus no charge in the first parasitic capacitor $C_{1/p1'}$ participates in the integration process. The charges in the second parasitic capacitors $C_{2/p2'}$, $C_{2/p3'}$, $C_{2/p4'}$ and $C_{2/p5'}$ may not participate in the integration process. Therefore, the first parasitic capacitor $C_{1/p1'}$ and the second parasitic capacitors $C_{2/p2'}$, $C_{2/p3'}$, $C_{2/p4'}$ and $C_{2/p5'}$ are prevented from producing corresponding base signals, and accordingly the base signals are reduced, such that the integrator 204 is prevented from reaching a saturated state before obtaining a desired signal amount. In this way, the dynamic range of the integrator 204 is increased.

In addition, since the parasitic capacitor $C_{p3}$ as illustrated in FIG. 1 is not present, transitions of the output voltage of the integrator are prevented, and the dynamic range of the integrator 204 is further increased.

Figure 3:
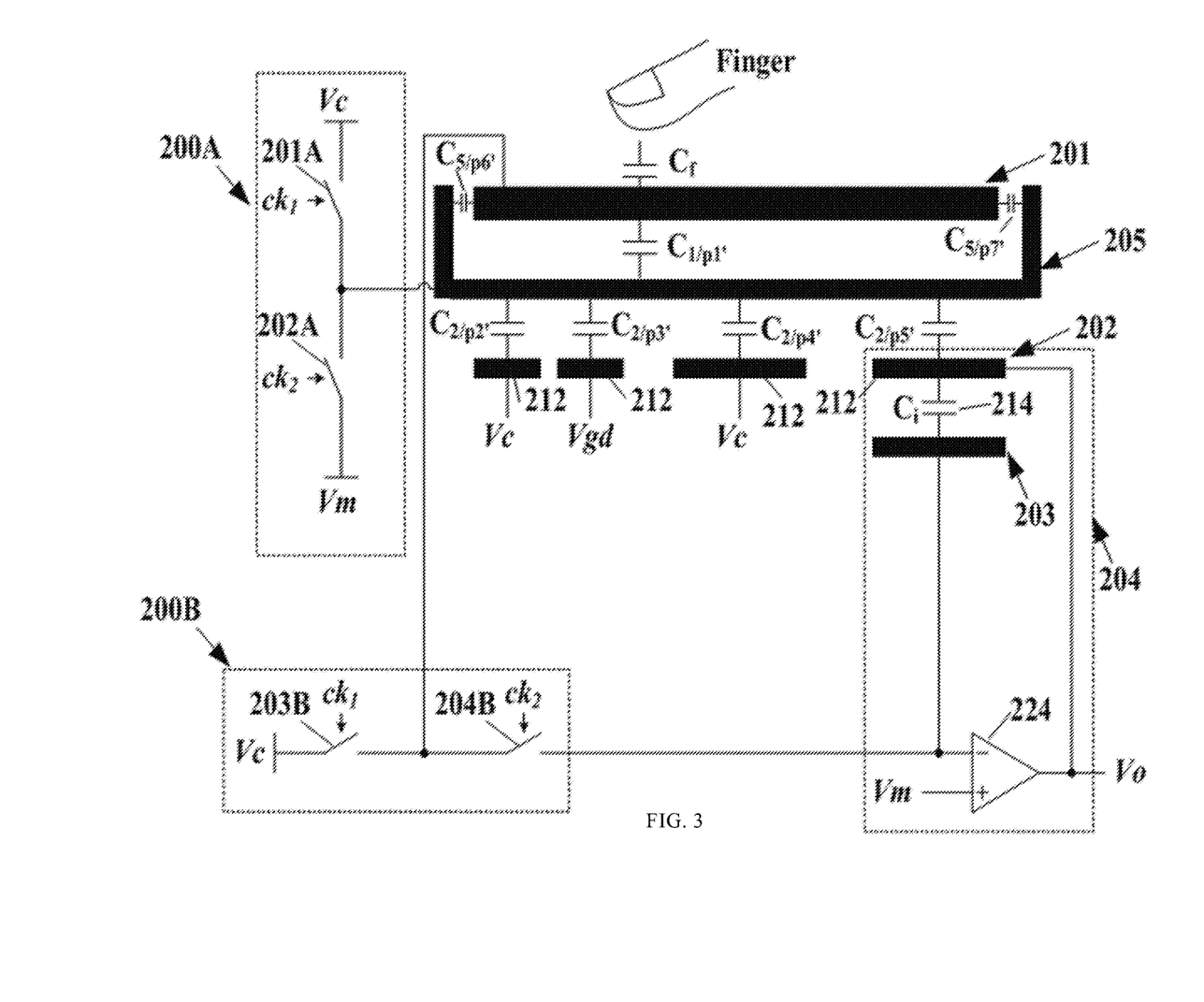
FIG. 3 is a schematic structural diagram of a capacitive fingerprint sensor according to Embodiment 2 of the present disclosure.

FIG. 3 is a schematic structural diagram of a capacitive sensor according to a second embodiment of the present disclosure. As illustrated in FIG. 3, in this embodiment, when the first electrode plate layer 201 is relatively thick, two side faces of the first electrode plate layer 201 may respectively form fourth parasitic capacitors (not shown) with any one or more of the metal electrodes of the second electrode plate layer 202 and the third electrode plate layer 203. In addition, the two side faces of the first electrode plate layer 201 may also form fifth parasitic capacitors $C_{5/p6'}$ and $C_{5/p7'}$ with the fourth electrode plate layer 205 respectively. Therefore, to prevent the side faces of the first electrode plate layer 201 from forming the fourth parasitic capacitor with any one or more of the second electrode plate layer 202 and the third electrode plate layer 203, and to make the fifth capacitors $C_{5/p6'}$ and $C_{5/p7'}$ formed by the side faces of the first electrode plate layer 201 with the fourth electrode plate layer 205 have no impact on the integrator 204, this embodiment makes some improvements on the structure of the fourth electrode plate layer 205. In this way, the fourth parasitic capacitor and the fifth parasitic capacitors are prevented from producing corresponding base signals which affects the dynamic range of the integrator 204.

Specifically, different from the first embodiment as described above, in this embodiment, the fourth electrode plate layer 205 surrounds the first electrode plate layer 201. For example, a metal electrode ring is additionally arranged on the fourth electrode plate layer 205 on the basis of FIG. 2. Specifically, referring to FIG. 3, in this embodiment, the area of the fourth electrode plate layer 205 is greater than that of the first electrode plate layer 201, a metal electrode ring extends vertically from the edge of the fourth electrode plate layer 205 in a direction towards the first electrode plate layer 201. A top portion of the metal electrode ring at least extends to be aligned with an upper surface of the first electrode plate layer 201; with this configuration, a side wall (i.e., the above metal electrode ring) of the fourth electrode plate layer 205 surrounds the first electrode plate layer 201. Due to the presence of the metal electrode ring, the first electrode plate layer 201, the second electrode plate layer 202 and the third electrode plate layer 203 are shielded from each other, such that the first electrode plate layer 201 is prevented from respectively forming the fourth parasitic capacitor with any one or more of the second electrode plate layer 202 and the third electrode plate layer 203. In addition, similar to that no charge exist in the first parasitic capacitor $C_{1/p1'}$, the fifth capacitors $C_{5/p6'}$ and $C_{5/p7'}$ formed by the side faces of the first electrode plate layer 201 with the side walls the fourth electrode plate layer 205 also have no charge, such that no charge in the fifth capacitors $C_{5/p6'}$ and $C_{5/p7'}$ participates the integration process of the integrator 204, and thus the dynamic range of the integrator 204 is further increased.

Figure 4:
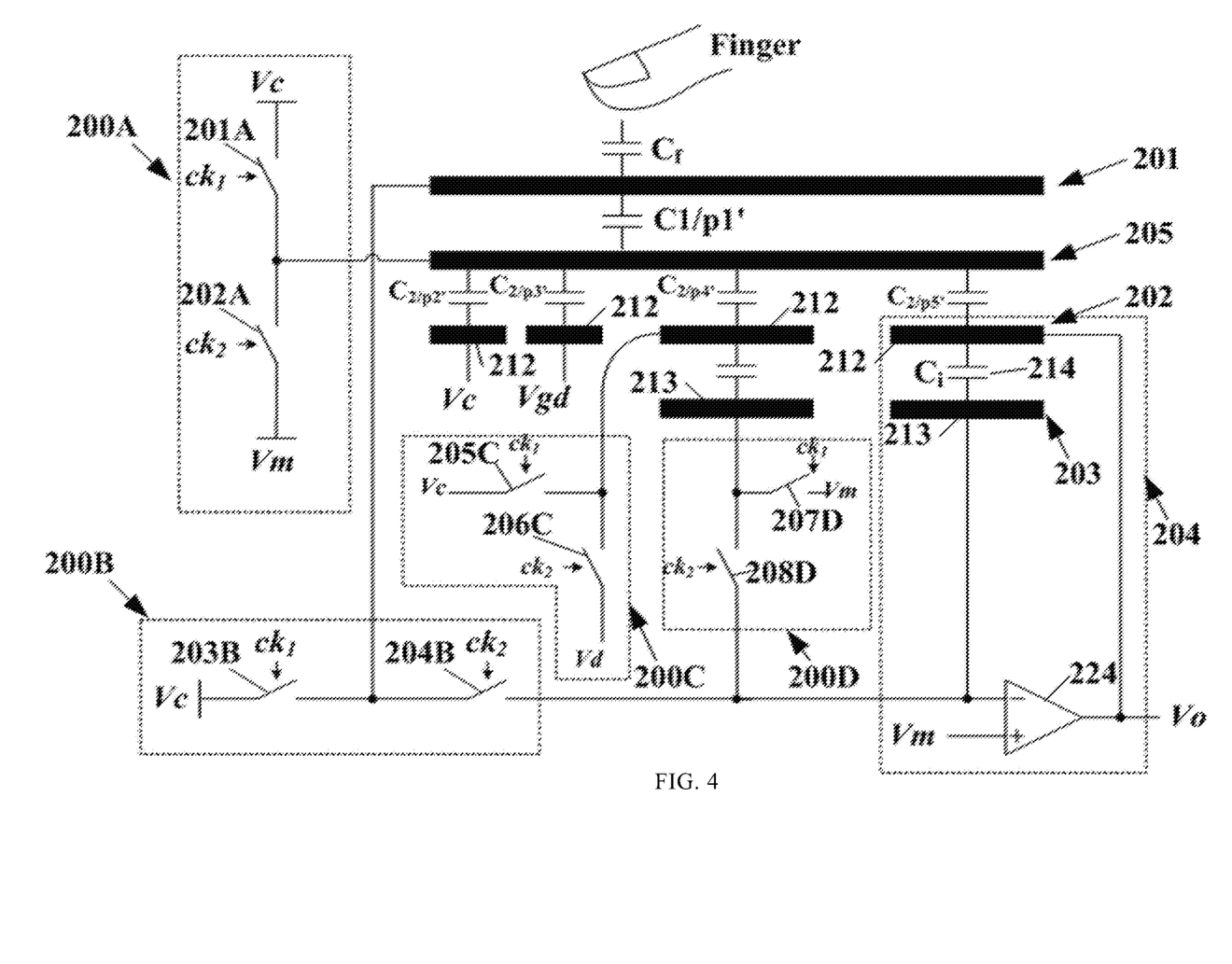
FIG. 4 is a schematic structural diagram of a capacitive fingerprint sensor according to Embodiment 3 of the present disclosure.

FIG. 4 is a schematic structural diagram of a capacitive fingerprint sensor according to a third embodiment of the present disclosure. As illustrated in FIG. 4, this embodiment differs from the embodiment as illustrated in FIG. 1 in that, the capacitive fingerprint sensor further includes a base cancelling capacitor $C_c$. Furthermore, the second electrode plate layer 202 includes at least two metal electrodes 212, and the third electrode plate layer 203 includes at least two third metal electrodes 213. One second metal electrode 212 of the second electrode plate layer 202 forms the base cancelling capacitor $C_c$ with one third metal electrode 213 of the third electrode plate layer 203, to cancel the base signals produced by a base capacitor and thus further increase the dynamic range of the integrator 204. In addition, the other second metal electrode 212 of the second electrode plate layer 202 forms the integrating capacitor 214 with the other third metal electrode 213 of the third electrode plate layer 203.

Specifically, in this embodiment, the voltage of the second metal electrode 212 forming the base cancelling capacitor $C_c$ in the second electrode plate layer 202 is the power-supply voltage $V_c$ or the output voltage $V_d$ of the external digital-to-analog converter DAC, the voltage of the third metal electrode 213 forming the base cancelling capacitor Cc in the third electrode plate layer 203 is the common-mode voltage $V_m$. As such, the base signals produced by the base capacitor are cancelled and thus the dynamic range of the integrator 204 is further increased.

Moreover, in this embodiment, the capacitive fingerprint sensor may further include a third switch circuit 200C. The third switch circuit 200C is controllable by a fifth switch control signal and a sixth switch control signal to make a switch-on or switch-off action, such that the voltage of the second metal electrode 212 forming the base cancelling capacitor $C_c$ in the second electrode plate layer 202 is the power-supply voltage $V_c$ or the output voltage $V_d$ of the external digital-to-analog converter DAC. The fifth switch control signal and the sixth switch control signal are inverse to each other.

In this embodiment, the fifth switch control signal and the sixth switch control signal respectively use the first switch control signal and the second switch control signal. That is, the fifth switch control signal and the sixth switch control signal are respectively the first clock signal $ck_1$ and the second clock signal $ck_2$.

Specifically, in this embodiment, the third switch circuit 200C may include:

A fifth switch 205C and a sixth switch 206C; the fifth switch 205C is controllable by the fifth switch control signal to make a switch-on or switch-off action, and the sixth switch 206C is controllable by the sixth switch control signal to make a switch-on or switch-off action; correspondingly, the voltage of the second metal electrode 212 forming the base cancelling capacitor $C_c$ in the second electrode plate layer 202 is the power-supply voltage $V_c$ or the output voltage $V_d$ of the external digital-to-analog converter DAC.

Further, in this embodiment, one terminal of the fifth switch 205C is connected to the power-supply voltage $V_c$, the other terminal of the fifth switch 205C is connected to one terminal of the sixth switch 206C and then electrically connected to the second metal electrode 212 forming the base cancelling capacitor $C_c$ in the second electrode plate layer 202, and the other terminal of the sixth switch 206C is connected to the output voltage $V_d$ of the external digital-to-analog converter DAC. With this configuration, the voltage of the second metal electrode 212 forming the base cancelling capacitor $C_c$ in the second electrode plate layer 202 is the power-supply voltage $V_c$ or the output voltage $V_d$ of the external digital-to-analog converter DAC.

Specifically, in this embodiment, the capacitive fingerprint sensor may further include:

A fourth switch circuit 200D; the fourth switch circuit 200D is controllable by a seventh switch control signal and an eighth switch control signal to make a switch-on or switch-off action; corresponding, the voltage of the third metal electrode 213 forming the base cancelling capacitor $C_c$ in the third electrode plate layer 203 is the common-mode voltage $V_m$. Further, in this embodiment, the fourth switch circuit 200D includes a seventh switch 207D and an eight switch 208D. One terminal of the seventh switch 207D is connected to the common-mode voltage $V_m$, the other terminal of the seventh switch 207D is connected to one terminal of the eight switch 208D and then connected to the third metal electrode 213 forming the base cancelling capacitor $C_c$ in the third electrode plate layer 203, and the other terminal of the eight switch 208D is connected to the input terminal of the integrator 204, and specifically connected to the negative input terminal of the amplifier 224 of the integrator 204.

The mechanism of the capacitive sensor in this embodiment is described as follows:

(3) When the first clock signal $ck_1$ is a high level, the first switch 201A, the third switch 203B, the fifth switch 205C and the seventh switch 207D are switched on; meanwhile the second clock signal $ck_2$ is a low level, the second switch 202A, the fourth switch 204B, the sixth switch 206C and the eighth switch 208D are switched off, such that the first electrode plate layer 201 and the fourth electrode plate 205 are both connected to the power-supply voltage $V_c$. Therefore, no charge exists in the first parasitic capacitor $C_{1/p1'}$, and the first parasitic capacitor $C_{1/p1'}$ is shielded relative to the integrator 204. Moreover, the second metal electrodes 212 of the second electrode plate layer 202 are connected to the common-mode voltage $V_m$, the system ground $V_{gd}$ or the output voltage $V_o$ of the integrator 204. These voltages are essentially all fixed levels, and thus the second parasitic capacitors $C_{2/p2'}$, $C_{2/p3'}$, $C_{2/p4'}$ and $C_{2/p5'}$ are shielded relative to the integrator 204. That is, the second parasitic capacitors $C_{2/p2'}$, $C_{2/p3'}$, $C_{2/p4'}$ and $C_{2/p5'}$ have no impact on the integrating capacitor 214.

With respect to the base cancelling capacitor $C_c$, the second metal electrode 212 forming the base cancelling capacitor $C_c$ in the second electrode plate layer 202 is connected to the power-supply voltage $V_c$, and the third metal electrode 213 forming the base cancelling capacitor $C_c$ in the third electrode plate layer 203 is connected to the common-mode voltage $V_m$, therefore, the base cancelling capacitor $C_c$ is full of charges.

(2) When the second clock signal $ck_2$ is a high level, the second switch 202A, the fourth switch 204B, the sixth switch 206C and the eighth switch 208D are switched on; meanwhile the first signal $ck_1$ is a low level, the first switch 201A, the third switch 203B, the fifth switch 205C and the seventh switch 207D are switched off, such that the first electrode plate layer 201 and the fourth electrode plate 205 are both connected to the common-mode voltage $V_m$. Therefore, no charge exists in the first parasitic capacitor $C_{1/p1'}$, and the first parasitic capacitor $C_{1/p1'}$ is shielded relative to the integrator 204. That is, no charge in the first parasitic capacitor $C_{1/p1'}$ participates in the integration process. Moreover, the second metal electrodes 212 of the second electrode plate layer 202 are connected to the common-mode voltage $V_m$ or the system ground $V_{gd}$ or the output voltage $V_o$ of the integrator. These voltages are essentially all fixed levels, and thus the second parasitic capacitors $C_{2/p2'}$, $C_{2/p3'}$, $C_{2/p4'}$ and $C_{2/p5'}$ are shielded relative to the integrator 204. That is, the second parasitic capacitors $C_{2/p2'}$, $C_{2/p3'}$, $C_{2/p4'}$ and $C_{2/p5'}$ have no impact on the integrating capacitor 214. Therefore, the charges in the second parasitic capacitors $C_{2/p2'}$, $C_{2/p3'}$, $C_{2/p4'}$ and $C_{2/p5'}$ do not participate in the integration process.

With respect to the integration cancelling capacitor $C_c$, the second metal electrode 212 forming the base cancelling base $C_c$ in the second electrode plate 202 is connected to the output voltage $V_d$ of the external digital-to-analog converter DAC, and the third metal electrode 213 forming the base cancelling capacitor $C_c$ in the third electrode plate layer 203 is connected to the common-mode voltage $V_m$; therefore, the charges in the base cancelling capacitor $C_c$ are transferred to the integrating capacitor 214, and thus the base signals produced by the base capacitor are cancelled to further increase the dynamic range of the integrator 204.

Figure 5:
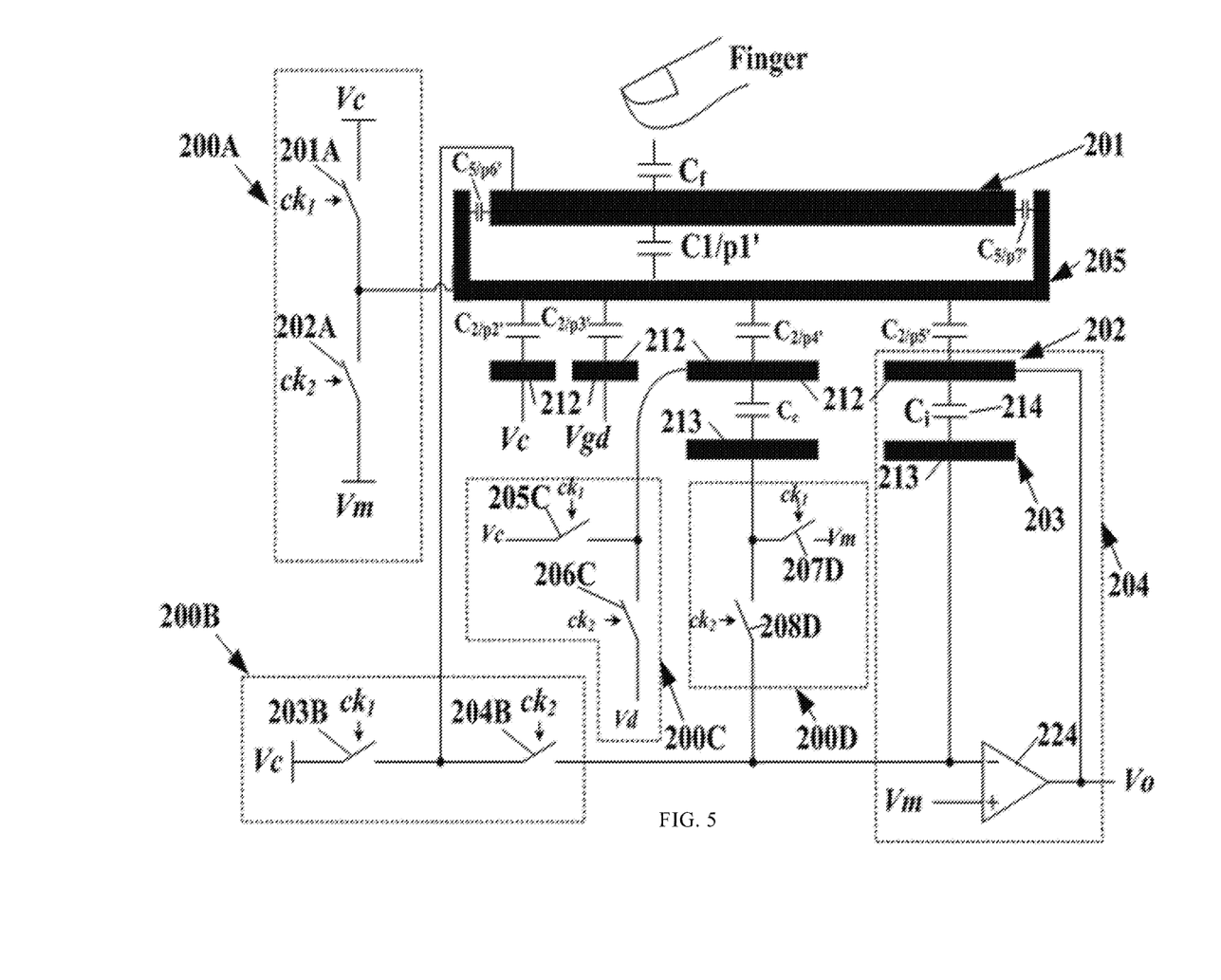
FIG. 5 is a schematic structural diagram of a capacitive fingerprint sensor according to Embodiment 4 of the present disclosure.

FIG. 5 is a schematic structural diagram of a capacitive fingerprint sensor according to a fourth embodiment of the present disclosure. As illustrated in FIG. 5, in this embodiment, when the first electrode plate layer 201 is relatively thick, two side faces of the first electrode plate layer 201 may respectively form fourth parasitic capacitors (not shown) with any one or more of the second electrode plate later 202 and the third electrode plate layer 203. In addition, the two side faces of the first electrode plate layer 201 may also form fifth parasitic capacitors $C_{5/p6'}$ and $C_{5/p7'}$ with the fourth electrode plate layer 205.

Therefore, to prevent the first electrode plate layer 201 from forming the fourth parasitic capacitor with any one or more of the second electrode plate layer 202 and the third electrode plate layer 203, and to make the fifth capacitors formed by the first electrode plate layer 201 with the fourth electrode plate layer 205 have no impact on the integrator 204, in this embodiment, a metal electrode ring (that is, a metal electrode ring) is further arranged on the fourth plate layer 205 based on the embodiment as illustrated in FIG. 4 to surround the first electrode plate layer 201, with a structure similar to that described in the second embodiment, such that the first electrode plate 201, the second electrode plate layer 202 and the third electrode plate layer 203 are shielded from each other. In this way, the first electrode plate layer 201 is prevented from being respectively forming the fourth parasitic capacitor with any one or more of the second electrode plate layer 202 and the third electrode plate layer 203. In addition, similar to that no charge exists in the first parasitic capacitor $C_{1/p1'}$, the fifth capacitors $C_{5/p6'}$ and $C_{5/p7'}$ also have no charge, such that no charge in the fifth capacitors $C_{5/p6'}$ and $C_{5/p7'}$ participates the integration process of the integrator 204.

Figure 6:
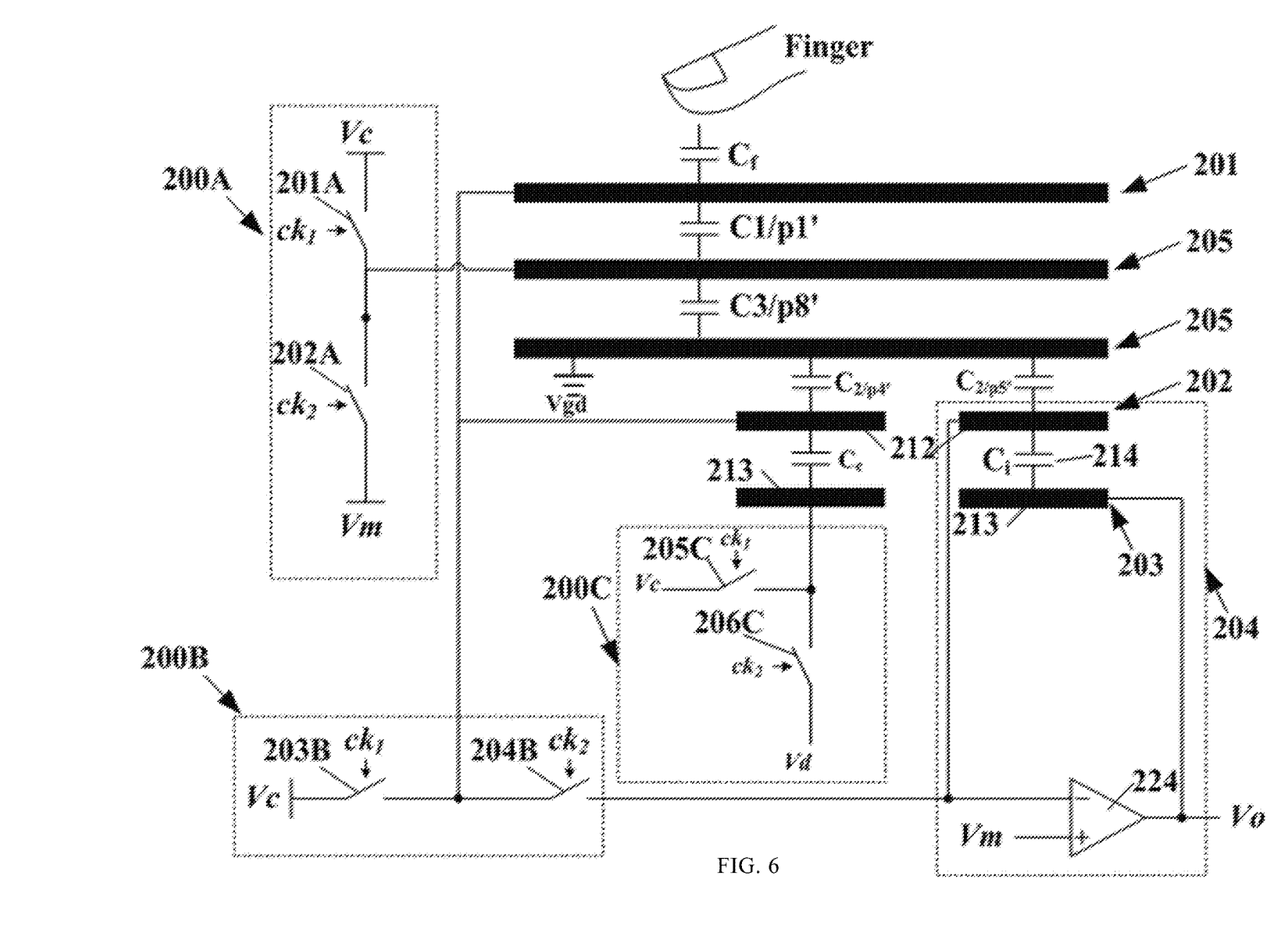
FIG. 6 is a schematic structural diagram of a capacitive fingerprint sensor according to Embodiment 5 of the present disclosure.

FIG. 6 is a schematic structural diagram of a capacitive fingerprint sensor according to a fifth embodiment of the present disclosure. As illustrated in FIG. 6, this embodiment differs from the above embodiments in the following aspects: two fourth electrode plate layers 205 are arranged from top to bottom between the first electrode plate layer 201 and the second electrode plate 202, the first parasitic capacitor $C_{1/p1'}$ is formed between the first electrode plate layer 201 and the fourth electrode plate layer 205 adjacent to the first electrode plate layer 201, and the second parasitic capacitors $C_{2/p4'}$ and $C_{2/p5'}$ are respectively formed between two second metal electrodes 212 of the second electrode plate layer 202 and the fourth electrode plate layer 205 adjacent to the second electrode plate layer 202. In addition, a third parasitic capacitor $C_{3/p8'}$ is formed between the two fourth electrode plate layers 205. The second parasitic capacitors $C_{2/p4'}$ and $C_{2/p5'}$ and the third parasitic capacitor $C_{3/p8'}$ have no impact on the integrating capacitor 214, and no charge exists in the first parasitic capacitor $C_{1/p1'}$. That is, the first parasitic capacitor $C_{1/p1'}$ has no impact on the integrating capacitor 214.

Optionally, in this embodiment, the capacitive fingerprint sensor further includes a first switch circuit 200A as described in the above embodiment. The first switch circuit 200A is controlled to make a switch-on or switch-off action, such that the voltage of the fourth electrode plate layer 205 adjacent to the first electrode plate layer 201 is the power-supply voltage $V_c$ or the common-mode voltage $V_m$. Correspondingly, the voltage of the first electrode plate layer 201 is the power-supply voltage $V_c$ or the common-mode voltage $V_m$, such that the first parasitic capacitor $C_{p1'}$ has no impact on the integrating capacitor 214.

Specifically, in this embodiment, the first switch circuit 200A includes a first switch 201A and a second switch 202A. The first switch 201A is controllable by a first switch control signal to make a switch-on or switch-off action, and the second switch 202A is controllable by a second switch control signal to make a switch-on or switch-off action, such that the voltage of the fourth electrode plate layer 205 adjacent to the first electrode plate layer 201 is the power-supply voltage $V_c$ or the common-mode voltage $V_m$. The first switch control signal and the second switch control signal are inverse to each other. The first switch control signal and the second switch control signal may be respectively the first clock signal and the second clock signal. One terminal of the first switch 201A is connected to the power-supply voltage $V_c$, the other terminal of the first switch 201A is connected to one terminal of the second switch 202A and then connected to the fourth electrode plate layer 205 adjacent to the first electrode plate layer 201, and the other terminal of the second switch 202A is connected to the common-mode voltage $V_m$.

Optionally, in this embodiment, the capacitive fingerprint sensor further includes a second switch circuit 200B. The second switch circuit 200B is controlled to make a switch-on or switch-off action, such that the voltage of the first electrode plate layer 201 is the power-supply voltage $V_c$ or the common-mode voltage $V_m$. Correspondingly, the voltage of the fourth electrode plate layer 205 adjacent to the first electrode plate later 201 is the power-supply voltage $V_c$ or the common-mode voltage $V_m$.

Specifically, in this embodiment, the second switch circuit 200B includes a third switch 203B and a fourth switch 204B. The third switch 203B is controllable by a third switch control signal to make a switch-on or switch-off action, and the fourth switch 204B is controllable by a fourth switch control signal to make a switch-on or switch-off action, such that the voltage of the first electrode plate layer 201 is the power-supply voltage $V_c$ or the common-mode voltage $V_m$. The third switch control signal and the fourth switch control signal are inverse to each other. The third switch control signal and the fourth switch control signal respectively use the first switch control signal and the second switch control signal. That is, the third switch control signal and the fourth switch control signal are respectively the first clock signal $ck_1$ and the second clock signal $ck_2$.

Optionally, in this embodiment, the voltage of the fourth electrode plate layer 205 adjacent to the second electrode plate later 202 is a fixed level, for example, the system ground $V_{gd}$, and thus the third parasitic capacitor $C_{3/p8'}$ has no impact on the integrating capacitor 214. The fourth electrode plate layer 205 adjacent to the second electrode plate layer 202 may be a single-sheet metal layer. The voltage of the fourth electrode plate layer 205 adjacent to the second electrode plate layer 202 is a fixed level, such that the second parasitic capacitors $C_{2/p4'}$ and $C_{2/p5'}$ are shielded relative to the integrator 204, and thus the second parasitic capacitors $C_{2/p4'}$ and $C_{2/p5'}$ and the third parasitic capacitor $C_{3/p8'}$ have no impact on the integrating capacitor 214.

In this embodiment, the voltage of the second metal electrode 212 forming the base cancelling capacitor $C_c$ in the second electrode plate layer 202 is the power-supply voltage $V_c$ or the common-mode voltage $V_m$, and the voltage of the third metal electrode 213 forming the base cancelling capacitor $C_c$ in the third electrode plate layer 203 is the power-supply voltage $V_c$ or the output voltage $V_d$ of the external digital-to-analog converter DAC. Therefore, the base signals produced by the base capacitor may be cancelled, and thus the dynamic range of the integrator 204 is further increased.

Optionally, in this embodiment, the capacitive fingerprint sensor may further include a third switch circuit 200C. Different from the above embodiments, the third switch circuit 200C is controllable by a fifth switch control signal and a sixth switch control signal to make a switch-on or switch-off action, such that the voltage of the third metal electrode 213 forming the base cancelling capacitor Cc in the third electrode plate layer 203 is the power-supply voltage $V_c$ or the output voltage $V_d$ of the external digital-to-analog converter DAC.

Specifically, in this embodiment, the third switch circuit 200C includes a fifth switch 205C and a sixth switch 206C. The fifth switch 205C is controllable by the fifth control signal to make a switch-on or switch-off action, and the sixth switch 206C is controllable by the sixth switch control signal to make a switch-on or switch-off action, such that the voltage of the third metal electrode 213 forming the base cancelling capacitor $C_c$ in the third electrode plate layer 203 is the power-supply voltage $V_c$ or the output voltage $V_d$ of the external digital-to-analog converter DAC. The fifth switch control signal and the sixth switch control signal are inverse to each other.

In this embodiment, the fifth switch control signal and the sixth switch control signal respectively use the first switch control signal and the second switch control signal. That is, the fifth switch control signal and the sixth switch control signal are respectively the first clock signal $ck_1$ and the second clock signal $ck_2$.

Further, in this embodiment, one terminal of the fifth switch 205C is connected to the power-supply voltage $V_c$, the other terminal of the fifth switch 205C is connected to one terminal of the sixth switch 206C and then electrically connected to the third metal electrode 213 forming the base cancelling capacitor $C_c$ in the third electrode plate layer 203, and the other terminal of the sixth switch 206C is connected to the output voltage $V_d$ of the external digital-to-analog converter DAC. With this configuration, the voltage of the third metal electrode 213 forming the base cancelling capacitor $C_c$ in the third electrode plate layer 203 is the power-supply voltage $V_c$ or the output voltage $V_d$ of the external digital-to-analog converter DAC.

In this embodiment, the second metal electrode 212 forming the integrator capacitor 214 in the second electrode plate layer 202 is connected to the negative input terminal of the amplifier 224, and the third metal electrode 213 forming the integrating capacitor 214 in the third electrode plate layer is connected to the output terminal of the amplifier 224, that is, connected to the output terminal of the integrator 204, such that the output voltage $V_o$ of the integrator is loaded to the third metal electrode 213 forming the integrating capacitor 214.

Working mechanism of the capacitive fingerprint sensor as illustrated in FIG. 6 is as follows:

(4) When the first clock signal $ck_1$ is a high level, the first switch 201A, the third switch 203B and the fifth switch 205C are switched on; meanwhile, the second clock signal $ck_2$ is a low level, the second switch 202A, the fourth switch 204B and the sixth switch 206C are switched off. The voltage of the first electrode plate layer 201 is the power-supply voltage $V_c$, the voltage of the fourth electrode plate layer 205 adjacent to the first electrode plate layer 201 is also the power-supply voltage $V_c$. Therefore, no charge exists in the first parasitic capacitor $C_{1/p1'}$.

In addition, since the voltage of the fourth electrode plate layer 205 adjacent to the second electrode plate layer 202 is the system ground $V_{gd}$, that is, connected to a fixed level, the third parasitic capacitor $C_{3/p8'}$ is shielded relative to the integrating capacitor 214. That is, the third parasitic capacitor $C_{3/p8'}$ has no impact on the integrating capacitor 214. Moreover, the voltage of the second metal electrode 212 forming the base cancelling capacitor $C_c$ in the second electrode plate layer is the power-supply voltage $V_c$, and the second metal electrode 212 forming the integrating capacitor 214 in the second electrode plate layer 202 is the common-mode voltage $V_m$, that is, connected to a fixed level; therefore, the second parasitic capacitors $C_{2/p4'}$ and $C_{2/p5'}$ are shielded relative to the integrating capacitor 214. That is, the second parasitic capacitors $C_{2/p4'}$ and $C_{2/p5'}$ have no impact on the integrating capacitor 214.

Further, the voltage of the third metal electrode 213 forming the base cancelling capacitor $C_c$ in the third electrode plate layer 203 is the power-supply voltage $V_c$, and the voltage of the second metal electrode 212 forming the base cancelling capacitor $C_c$ in the second electrode plate layer 202 is also the power-supply voltage $V_c$. Therefore, no charge exists in the base cancelling capacitor $C_c$.

(2) When the first clock signal $ck_1$ is a low level, the first switch 201A, the third switch 203B and the fifth switch 205C are switched off; meanwhile, the second clock signal $ck_2$ is a high level, and the second switch 202A, the fourth switch 204B and the sixth switch 206C are switched on. In this case, the voltage of the first electrode plate layer 201 is the common-mode voltage $V_m$, and the voltage of the fourth electrode plate layer 205 adjacent to the first electrode plate layer 201 is also the common-mode voltage $V_m$. Therefore, no charge exists in the first parasitic capacitor $C_{1/p1'}$. That is, no charge in the first parasitic capacitor $C_{1/p1'}$ participates in the integration process of the integrator 204.

In addition, since the voltage of the fourth electrode plate layer 205 adjacent to the second electrode plate layer 202 is the system ground $V_{gd}$, that is, connected to a fixed level, the third parasitic capacitor $C_{3/p8'}$ is shielded relative to the integrating capacitor 214. That is, the third parasitic capacitor $C_{3/p8'}$ has no impact on the integrating capacitor 214.

In addition, the voltage of the second metal electrode 212 forming the base cancelling capacitor $C_c$ in the second electrode plate layer 202 is the common-mode voltage $V_m$, that is, connected to a fixed level, and the voltage of the second metal electrode 212 forming the integrating capacitor $C_i$ in the second electrode plate layer 202 is also the common-voltage voltage $V_m$, that is, connected to a fixed level; therefore, the second parasitic capacitors $C_{2/p4'}$ and $C_{2/p5'}$ are shielded relative to the integrating capacitor 214, and the charges in the second parasitic capacitors $C_{2/p4'}$ and $C_{2/p5'}$ may not be transferred to the integrating capacitor 214. That is, the second parasitic capacitors $C_{2/p4'}$ and $C_{2/p5'}$ have no impact on the integrating capacitor 214.

Further, the voltage of the third metal electrode 213 forming the base cancelling capacitor $C_c$ in the third electrode plate layer 203 is the output voltage $V_d$ of the external digital-to-analog converter DAC, and the voltage of the second metal electrode 212 forming the base cancelling capacitor $C_c$ in the second electrode plate layer 202 is the common-mode voltage $V_m$. Therefore, the charges in the base cancelling capacitor $C_c$ are transferred to the integrating capacitor 214 to participate in the integration process, to cancelling the base signals produced by the base capacitor.

Figure 7:
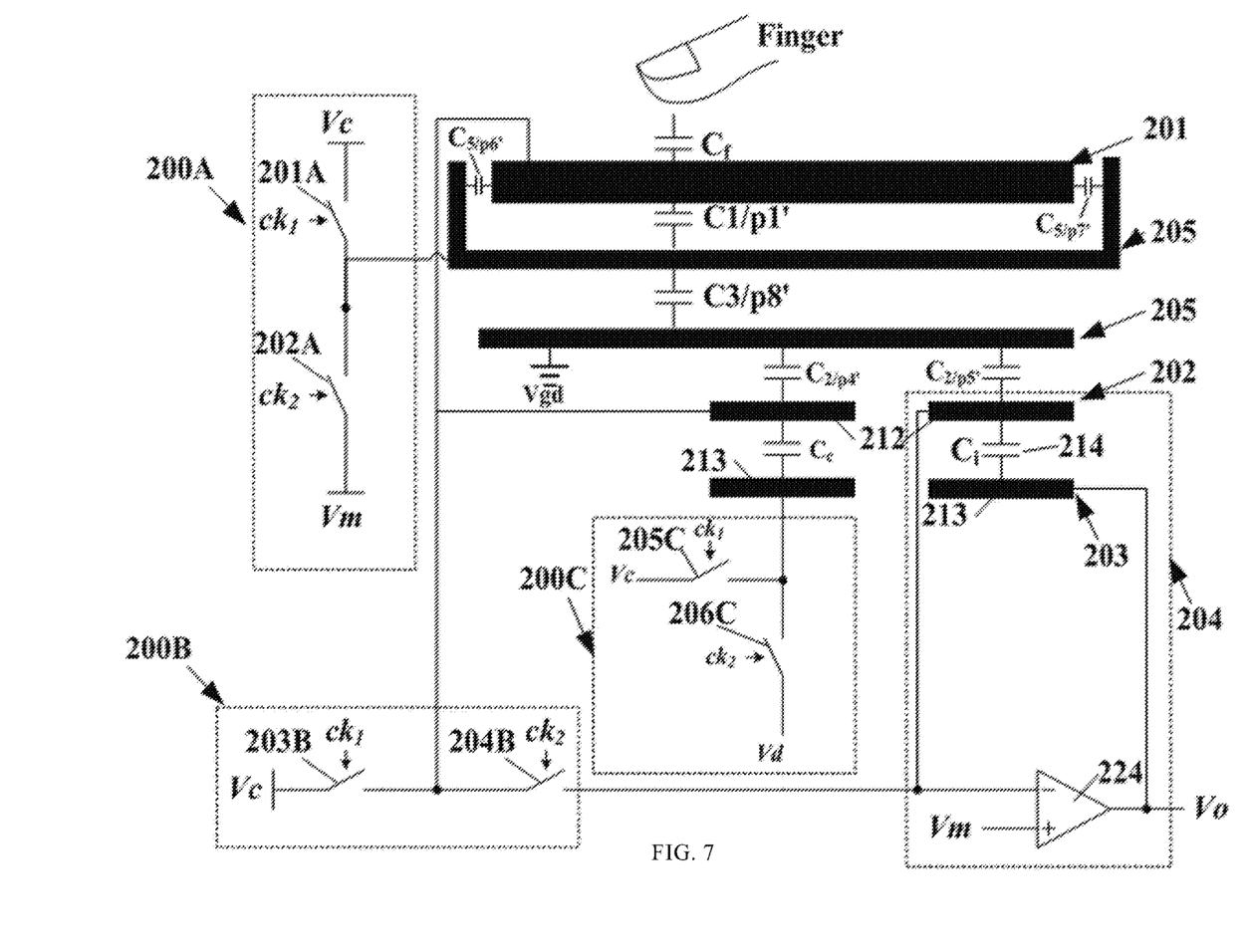
FIG. 7 is a schematic structural diagram of a capacitive fingerprint sensor according to Embodiment 6 of the present disclosure.

FIG. 7 is a schematic structural diagram of a capacitive fingerprint sensor according to a sixth embodiment of the present disclosure. As illustrated in FIG. 7, referring to the above relevant embodiments, specifically, in the embodiment as illustrated in FIG. 6, if the first electrode plate layer 201 is relatively thick, two side faces of the first electrode plate layer 201 may respectively form fourth parasitic capacitors (now shown) with any one or more of the second electrode plate layer 202, the third electrode plate layer 203 and the fourth electrode plate layer 205 adjacent to the first electrode plate layer 201, and the two side faces of the first electrode plate layer 201 may also form fifth parasitic capacitors $C_{5/p6'}$ and $C_{5/p7'}$ with the fourth electrode plate layer 205 adjacent to the first electrode plate layer 201. With respect to the above problem, as illustrated in FIG. 7, in the capacitive fingerprint sensor according to this embodiment, based on the structure as illustrated in FIG. 6, a metal electrode ring (that is, a metal electrode ring) are further formed on the fourth electrode plate layer 205 adjacent to the first electrode plate layer 201 to surround the first electrode plate layer 201, such that the dynamic range of the integrator 204 is further increased. The specific structure of the metal electrode ring is similar to that described in the second embodiment, and the detailed mechanism may be referenced to the above relevant embodiments, which are not described herein any further.

It should be noted that, in the embodiments as illustrated in FIG. 6 and FIG. 7, since two fourth electrode plate layers 205 are arranged between the first electrode plate layer and the second electrode plate layer, the electrode plate layers connected to the negative input terminal and the output terminal of the integrator 214 may be exchanged.

Figure 8:
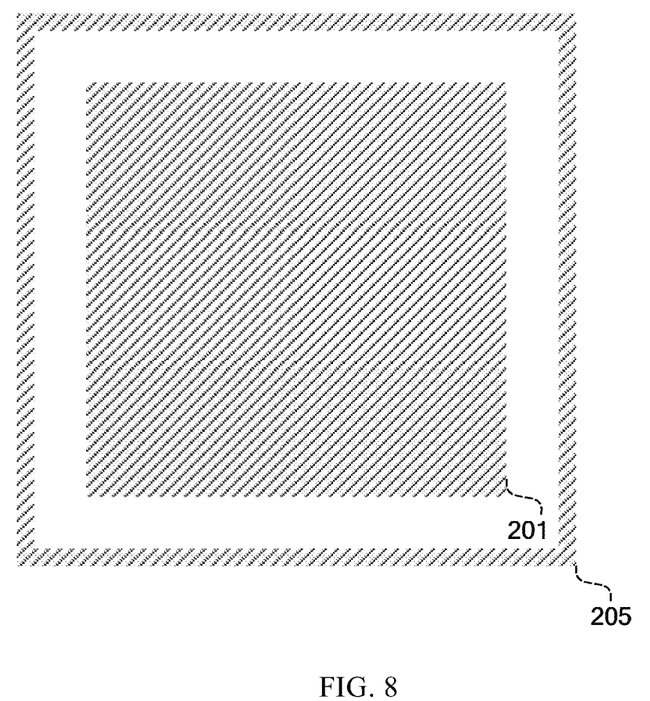
FIG. 8 is a schematic elevated plane view of a capacitive fingerprint sensor according to Embodiment 7 of the present disclosure.

FIG. 8 is a schematic elevated plane view of a capacitive fingerprint sensor according to a seven embodiment of the present disclosure. In this embodiment, the capacitive fingerprint sensor may employ the structure as illustrated in FIG. 3, FIG. 5 or FIG. 7, and the metal electrode ring of the fourth electrode plate layer 205 adjacent to the first electrode plate layer 201 surrounds the first electrode plate layer 201.

It should be noted that the drawings cited in the above embodiments are merely illustrative, arrangement and deployment of various elements and devices in the circuit may be consistent with the drawings, or may be randomly defined as long as the functions of the circuit in the embodiments are implemented.

The apparatus according to the embodiments of the present application may be practiced by a computer program. A person skilled in the art should understand the above division of units and modules is only an exemplary one, and if the apparatus is divided into other units or modules or not divided, the technical solution shall also fall within the protection scope of the present application as long as the information object has the above functions.

A person skilled in the art shall understand that the embodiments of the present application may be described to illustrate methods, apparatuses (devices), or computer program products. Therefore, hardware embodiments, software embodiments, or hardware-plus-software embodiments may be used to illustrate the present application. In addition, the present application may further employ a computer program product which may be implemented by at least one non-transitory computer-readable storage medium with an executable program code stored thereon. The non-transitory computer-readable storage medium comprises but not limited to a disk memory, a CD-ROM, and an optical memory.

The present disclosure is described based on the flowcharts and/or block diagrams of the method, apparatus (device), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing devices to work in a specific mode, such that the instructions stored on the non-transitory computer-readable memory implement a product comprising an instruction apparatus, where the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although the preferred embodiments of the present application are described above, once knowing the basic creative concept, a person skilled in the art can make other modifications and variations to these embodiments. Therefore, the appended claims are intended to be construed as covering the preferred embodiments and all the modifications and variations falling within the scope of the present application. Obviously, a person skilled in the art can make various modifications and variations to the present application without departing from the spirit and scope of the present application. In this way, the present application is intended to cover the modifications and variations if they fall within the scope of the appended claims of the present application and equivalent technologies thereof.

What is claimed is:

1. A capacitive fingerprint sensor, comprising:
a first electrode plate layer, a second electrode plate layer and a third electrode plate layer that are sequentially arranged; and
an integrator having an integrating capacitor;
wherein the first electrode plate layer forms a fingerprint capacitor with a finger, at least one fourth electrode plate layer is arranged between the first electrode plate layer and the second electrode plate layer, a first parasitic capacitor is formed between the first electrode plate layer and the fourth electrode plate layer, and a second parasitic capacitor is formed between the second electrode plate layer and the fourth electrode plate layer;
the integrating capacitor is formed between the second electrode plate layer and the third electrode plate layer; and
the integrating capacitor is configured to store charges from the fingerprint capacitor,
the capacitive fingerprint sensor further comprising a first switch circuit, wherein the first switch circuit causes, via a switch-on or switch-off action, a voltage of the fourth electrode plate layer to be a power-supply voltage or a common-mode voltage, and a voltage of the first electrode plate layer is the power-supply voltage or the common-mode voltage.

2. The capacitive fingerprint sensor according to claim 1, wherein the second electrode plate layer comprises at least one second metal electrode, the third electrode plate layer comprises a third metal electrode, and the integrating capacitor is formed between one second metal electrode of the second electrode plate layer and the third metal electrode.

3. The capacitive fingerprint sensor according to claim 1, further comprising a base cancelling capacitor; wherein the second electrode plate layer comprises at least two second metal electrodes, and the third electrode plate layer comprises at least two third metal electrodes, wherein one second metal electrode of the second electrode plate layer and one third metal electrode of the third electrode plate layer form the base cancelling capacitor; and another second metal electrode of the second electrode plate layer and another third metal electrode of the third electrode plate layer form the integrating capacitor.

4. The capacitive fingerprint sensor according to claim 3, wherein a voltage of the second metal electrode of the base cancelling capacitor formed in the second electrode plate layer is a power-supply voltage or an output voltage of an external digital-to-analog converter, and a voltage of the third metal electrode of the base cancelling capacitor formed in the third electrode plate layer is a common-mode voltage.

5. The capacitive fingerprint sensor according to claim 4, further comprising a third switch circuit, wherein the third switch circuit is controllable by a fifth switch control signal and a sixth switch control signal to make a switch-on or switch-off action, such that a voltage of the second metal electrode of the base cancelling capacitor formed in the second electrode plate layer is the power-supply voltage or the output voltage of the external digital-to-analog converter.

6. The capacitive fingerprint sensor according to claim 5, wherein the third switch circuit comprises a fifth switch and a sixth switch, wherein the fifth switch is controllable by the fifth switch control instruction to make a switch-on or switch-off action, and the sixth switch is controllable by the sixth switch control signal to make a switch-on or switch-off action such that voltage of the second metal electrode of the base cancelling capacitor formed in the second electrode plate layer is the power-supply voltage or the output voltage of the external digital-to-analog converter, wherein the fifth switch control signal and the sixth switch control signal are inverse to each other.

7. The capacitive fingerprint sensor according to claim 4, further comprising a fourth switch circuit, wherein the fourth switch circuit is controllable by a seventh switch control signal and an eighth switch control signal to make a switch-on or switch-off action, such that the voltage of the third metal electrode of the base cancelling capacitor formed in the third electrode plate layer is the common-mode voltage.

8. The capacitive fingerprint sensor according to claim 7, wherein the fourth switch circuit comprises a seventh switch and an eighth switch, wherein one terminal of the seventh switch is connected to the common-mode voltage, the other terminal of the seventh switch is connected to one terminal of the eighth switch and then connected to the third metal electrode of the base cancelling capacitor formed in the third electrode plate layer, and the other terminal of the eighth switch is connected to an input terminal of the integrator.

9. The capacitive fingerprint sensor according to claim 1, wherein the first switch circuit comprises a first switch and a second switch, wherein the first switch is controllable by a first switch control signal to make a switch-on or switch-off action, and the second switch is controllable by a second switch control signal to make a switch-on or switch-off action such that the voltage of the fourth electrode plate layer is the power-supply voltage or the common-mode voltage, wherein the first switch control signal and the second switch control signal are inverse to each other.

10. The capacitive fingerprint sensor according to claim 1, further comprising a second switch circuit, wherein the second switch circuit causes, via a switch-on or switch-off action, the voltage of the first electrode plate layer to be a power-supply voltage or a common-mode voltage, and causes the voltage of the fourth electrode plate layer to be the power-supply voltage or the common-mode voltage.

11. The capacitive fingerprint sensor according to claim 10, wherein the second switch circuit comprises a third switch and a fourth switch, wherein the third switch is controllable by a third switch control signal to make a switch-on or switch-off action, and the fourth switch is controllable by a fourth switch control signal to make a switch-on or switch-off action such that the voltage of the first electrode plate layer is the power-supply voltage or the common-mode voltage, wherein the third switch control signal and the fourth switch control signal are inverse to each other.

12. The capacitive fingerprint sensor according to claim 1, wherein the at least one fourth electrode plate layer comprises a metal electrode ring formed by extension toward the first electrode plate layer, wherein the metal electrode ring surrounds the first electrode plate layer to shield the first electrode plate layer, the second electrode plate layer and the third electrode plate layer.

13. The capacitive fingerprint sensor according to claim 12, wherein a side face of the first electrode plate layer forms a fifth parasitic capacitor with the metal electrode ring; wherein the metal electrode ring is formed on the fourth electrode plate layer adjacent to the first electrode plate layer, and a top portion of the metal electrode ring at least extends to be align with an upper surface of the first electrode plate layer.

14. The capacitive fingerprint sensor according to claim 1, wherein the second electrode plate layer is connected to an output terminal of the integrator.

\* \* \* \* \*